E. O. JONES.
Horse Rake.
No. 56,227.
Patented July 10, 1866.
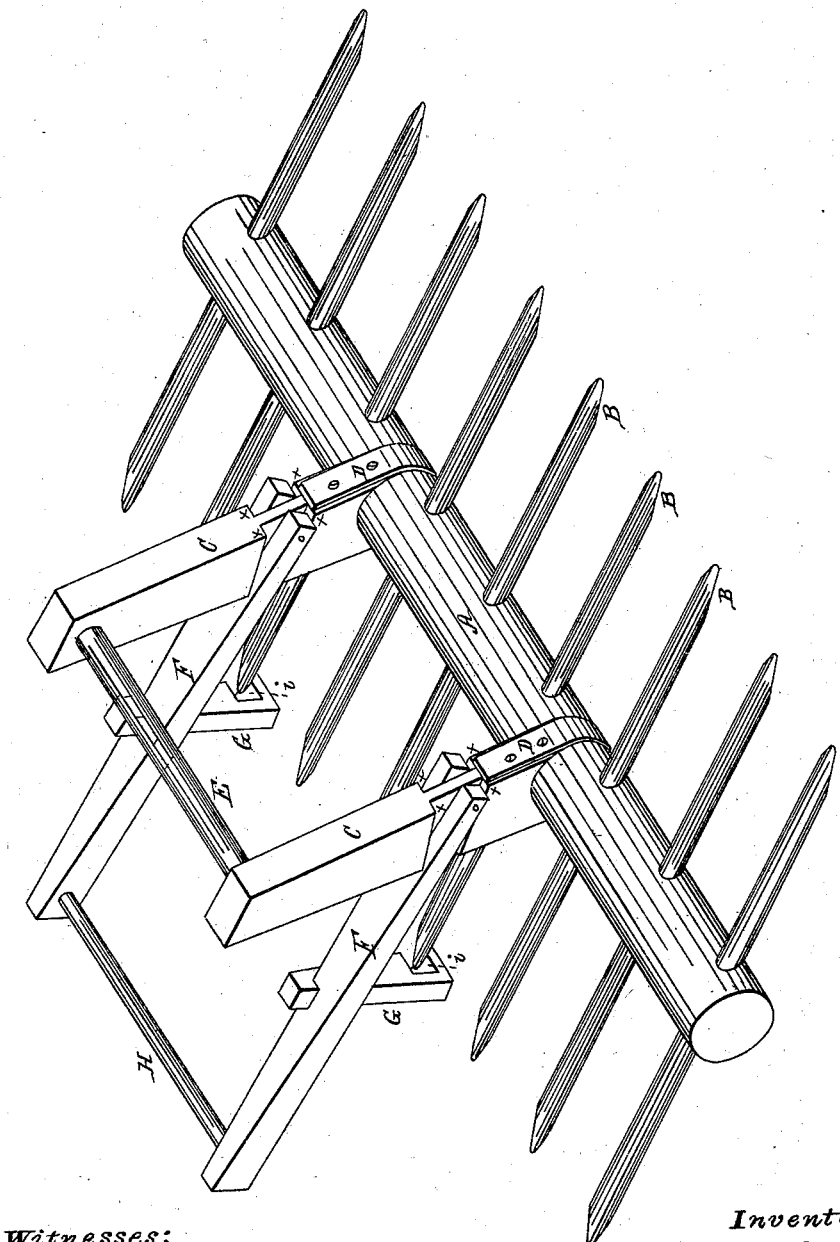
Witnesses:
Charles Alexander
John P. Jacobs
Inventor:
E. O. Jones
per
Alexander & Mason
Attorneys

UNITED STATES PATENT OFFICE.

E. O. JONES, OF OAKWOOD, MICHIGAN.

IMPROVEMENT IN HORSE-RAKES.

Specification forming part of Letters Patent No. 56,227, dated July 10, 1866.

*To all whom it may concern:*

Be it known that I, E. O. JONES, of Oakwood, in the county of Oakland and State of Michigan, have invented certain new and useful Improvements in Horse-Rakes; and I do hereby declare that the following is a full, clear, and exact description of the same, reference being had to the accompanying drawing, and to the letters of reference marked thereon.

In the annexed drawing, making part of this specification, A represents the rake-shaft, which is made of the usual length and shape. B B represent the teeth of this rake-shaft, which pass through and are firmly secured in openings in said shaft, so that their ends will project equal distances on each side. Both ends of these rake-teeth are pointed, as represented.

C C represent two standards, which are made concave at their lower ends, the concavity being made to fit the periphery or convexity of the shaft A.

D represents metallic straps which pass around the shaft A, and which are secured firmly at their ends to the standards C C. These straps, together with the concave ends of the standards, form journal-bearings for the rake-shaft, and in which said rake-shaft is allowed to turn when it is desired.

The standards C C are connected at their upper ends by a bar, E. These standards have square grooves cut across them on each side a short distance above the rake-shaft.

F F represent two levers with slots cut in their ends, and these slots receive the standards C C at the points where they are grooved, and are pivoted loosely to said standards. The grooves in the standards are made sufficiently large to allow the ends of the levers to play freely, the ends of said levers catching upon the shoulders $x\ x$ of the grooves in the standards when desired. The levers F are connected at their outer ends by a handle, H.

Depending from levers F are two arms, G G. These arms have grooves $i\ i$ cut in them near their lower ends. The groove on one arm is cut on the inside and the other on the outside, as shown in the drawing. The arms G are situated far enough from the rake-shaft for the ends of two of the teeth of said shaft to catch into the grooves $i\ i$.

Power is applied to this rake by means of rods or hooks secured on the front sides of the standards C C.

In using this machine the operator stands behind it with his hands upon the handle H. Two of the teeth are caught in the slots $i\ i$, which makes the rake-shaft rigid. The horse draws the rake until a sufficient quantity of hay is caught upon the forward teeth. As soon as this occurs the operator gives the levers F F, through handle H, a little twitch to the right, which disengages the teeth from the slots $i\ i$ in arms G. The rake-shaft being thus freed revolves until the teeth which were before stand behind the shaft, making a half-revolution. The operator then drops slightly the levers F and gives them a movement to the left, which catches two of the teeth in the slots $i\ i$, and the rake is again rigid and commences to gather hay at once. This operation is repeated as often as the hay gathered upon the teeth requires it.

Having thus fully described my invention, what I claim as new, and desire to secure by Letters Patent, is—

1. The standards C C, grooved, as described, to receive the slotted ends of the levers F F, when used with the said levers and the rake-shaft, as and for the purpose specified.

2. The levers F F, provided with the slotted arms G G, when used to catch the ends of the rake-teeth, as and for the purpose specified.

As evidence that I claim the foregoing I have hereunto set my hand in the presence of two witnesses.

E. O. JONES.

Witnesses:
ALBERT GREGORY,
DELIA H. GREGORY.